US011070647B1

(12) United States Patent
 Korobov et al.

(10) Patent No.: US 11,070,647 B1
(45) Date of Patent: Jul. 20, 2021

(54) SEAMLESS CROSS-PLATFORM SYNCHRONIZATION OF USER ACTIVITIES AND APPLICATION DATA BETWEEN MOBILE AND DESKTOP DEVICES

(71) Applicant: Parallels International GmbH, Schaffhausen (CH)

(72) Inventors: Ivan Korobov, Moscow (RU); Yuri Makarov, Moscow (RU); Andrey A. Omelyanchuk, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 145 days.

(21) Appl. No.: 15/458,365

(22) Filed: Mar. 14, 2017

(51) Int. Cl.
    | | |
    |---|---|
    | *H04L 29/08* | (2006.01) |
    | *H04W 36/32* | (2009.01) |
    | *H04L 29/06* | (2006.01) |
    | *H04W 36/00* | (2009.01) |
    | *G06F 9/455* | (2018.01) |
    | *H04W 76/14* | (2018.01) |
    | *H04W 4/80* | (2018.01) |

(52) U.S. Cl.
 CPC .......... *H04L 67/34* (2013.01); *G06F 9/45545* (2013.01); *H04L 63/0876* (2013.01); *H04L 67/06* (2013.01); *H04L 67/10* (2013.01); *H04L 67/1095* (2013.01); *H04L 67/141* (2013.01); *H04L 67/148* (2013.01); *H04L 67/42* (2013.01); *H04W 36/0022* (2013.01); *H04W 36/32* (2013.01); *H04W 76/14* (2018.02); *H04W 4/80* (2018.02)

(58) Field of Classification Search
 CPC ..... H04L 67/34; H04L 63/0876; H04L 67/06; H04L 67/10; H04L 67/1095; H04L 67/141; H04L 67/148; H04L 67/42; G06F 9/45545; H04W 76/14; H04W 36/0022; H04W 36/32; H04W 4/80
 See application file for complete search history.

(56) References Cited

U.S. PATENT DOCUMENTS

| | | | |
|---|---|---|---|
| 8,805,947 B1 * | 8/2014 | Kuzkin | H04L 67/40 709/208 |
| 9,558,051 B1 * | 1/2017 | Taylor | G06F 9/546 |

(Continued)

*Primary Examiner* — Tonia L Dollinger
*Assistant Examiner* — Jihad K Boustany
(74) *Attorney, Agent, or Firm* — Lowenstein Sandler LLP

(57) ABSTRACT

System for synchronization of content between open applications. Remote access server (RAS) provides remote desktop to a mobile device. The mobile device has a remote access client component and communicates with the RAS and with an authorization component. First computer with a host application is connected to the RAS. Second computer is connected to the RAS and has a native application or a VM with a guest application. Authentication component authenticates the mobile device and the computers. The RAS synchronizes data between the mobile device and the computers, and provides a remote desktop for the mobile device via a remote access client component. The remote desktop includes the host application. Data entered in the host application for the first computer on the mobile device appears in the remote desktop via the RAS, and is synchronized with the guest application on the second computer.

19 Claims, 7 Drawing Sheets

(56) References Cited

U.S. PATENT DOCUMENTS

| | | | |
|---|---|---|---|
| 2005/0130653 A1* | 6/2005 | Bisdikian | H04M 1/72569 455/432.3 |
| 2006/0120518 A1* | 6/2006 | Baudino | H04L 67/303 379/91.02 |
| 2007/0088762 A1* | 4/2007 | Harris | G06F 9/52 |
| 2012/0075204 A1* | 3/2012 | Murray | G06F 3/0416 345/173 |
| 2013/0041790 A1* | 2/2013 | Murugesan | H04L 29/06 705/30 |
| 2013/0066832 A1* | 3/2013 | Sheehan | G06Q 10/00 707/634 |
| 2014/0105181 A1* | 4/2014 | Milam | H04L 65/1069 370/332 |
| 2014/0164315 A1* | 6/2014 | Golshan | H04L 65/403 707/608 |
| 2014/0267002 A1* | 9/2014 | Luna | H04M 1/7253 345/156 |
| 2014/0349611 A1* | 11/2014 | Kant | H04W 8/18 455/411 |
| 2014/0359637 A1* | 12/2014 | Yan | G06F 9/4881 718/108 |
| 2014/0364058 A1* | 12/2014 | Chew | G06F 21/34 455/41.1 |
| 2014/0380137 A1* | 12/2014 | Zhang | G06F 17/227 715/202 |
| 2015/0149587 A1* | 5/2015 | Wang | G06F 16/13 709/217 |
| 2015/0208206 A1* | 7/2015 | Heydlauf | H04L 67/025 455/411 |
| 2015/0350356 A1* | 12/2015 | Linn | H04W 52/0229 709/202 |
| 2015/0373084 A1* | 12/2015 | Krochmal | G06F 9/543 709/217 |
| 2016/0308858 A1* | 10/2016 | Nordstrom | H04L 63/068 |
| 2017/0048373 A1* | 2/2017 | Dees | H04L 12/2809 |
| 2018/0081962 A1* | 3/2018 | Obitko | G06F 16/27 |

\* cited by examiner

SEAMLESS CROSS-PLATFORM SYNCHRONIZATION OF USER ACTIVITIES AND APPLICATION DATA BETWEEN MOBILE AND DESKTOP DEVICES

BACKGROUND OF THE INVENTION

Field of the Invention

The present invention is related to cross-platform synchronization and, in particular, to a method and system for providing a user with an ability for working with the same application on different devices in a synchronized mode.

Description of the Related Art

Currently, APPLE has announced a feature called "continuity," which a user can take advantage of when using different devices such as iPhone, iPad and MAC computer. Now a user can start writing an email on his iPhone and pick up where he left off when he sits down at his MAC computer at home or in the office. A user can browse the web on his MAC and continue from the same link on his iPad. It all happens automatically when both devices are signed into the same iCloud account. A handoff can be used with applications like Mail, Safari, Pages, Numbers, Keynote, Maps, Messages, Reminders, Calendar, and Contacts. Now, developers can build a handoff feature into their applications as well.

However, the APPLE continuity feature has significant usability limitations. For example, it requires having the same application to be installed on all of the devices, which is not possible, for example, in case of MICROSOFT VISIO. If a user wants to use MICROSOFT VISIO on his iPhone, and then continue using it on his desktop, this is not possible because the MICROSOFT VISIO (or other application) cannot be installed on the iPhone.

Thus, the conventional "continuity" feature has certain limitations:

First, it works only for applications developed by the same software vendor, so one cannot, for example, start editing a document in pages for iOS and continue editing the document in MICROSOFT WORD for MAC OS;

Second, not all applications (e.g., MICROSOFT OFFICE) has handoff support now, so one cannot, for example, start composing an e-mail in MICROSOFT OUTLOOK for iOS and continue it in MICROSOFT OUTLOOK for MAC OS; and Third, for obvious reasons, the handoff feature does not work between APPLE and non-APPLE devices.

PARALLELS Access (PAX) and PARALLELS Remote Application Server (RAS) Clients for iOS provide near-native experience for a user working with desktop applications running on a remote computer or in a terminal session, as if they run on the mobile device. With PAX/RAS clients, a user can use applications from his iOS devices, which are not available on iOS otherwise (for example, MICROSOFT OFFICE for MICROSOFT WINDOWS applications). Nevertheless, this approach does not help to solve a problem with cross-platform activities and data synchronization between different devices, so a user either should keep his documents in a shared cloud storage, or copy and sync them manually and then feed to the appropriate application.

Accordingly, a method and system for providing seamless cross-platform synchronization of application data between multiple devices, including virtualized and non-virtualized applications and devices with different operating systems running on them are desired.

SUMMARY OF THE INVENTION

The present invention is related to cross-platform synchronization and, in particular, to a method and system for working with the same application (or an application with similar functionality) on different devices in a synchronized mode that substantially overcomes the disadvantages of the related art.

According to an exemplary embodiment, a method, system and computer program product for cross-platform application usage is provided. A remote access server configured to provide a remote desktop to a mobile device. A mobile device running a remote access client component and in communication with the remote access server and with an authentication component over a network. A first computer has a host application running on it and is connected to the remote access server. A second computer connected to the remote access server and running a Virtual Machine (VM) with a guest application, or, optionally, a native application instead of the guest application. The authentication component provides authentication for the mobile device and the first or second computer when the mobile device is located in a proximity to at least the second computer. The remote access server is configured to synchronize data between the mobile device and the first computer. The remote access server provides a remote desktop for the mobile device via a remote access agent component, where the remote desktop includes the host application. Data entered in the host application on the mobile device appears in the remote desktop via the remote access server, optionally when the mobile device is placed in proximity to the first computer, or when the mobile device and the first computer are not close to each other. Data entered on the mobile device and the data entered in the host application appears in the guest application or a native application (e.g., a native MAC OS application) via a wireless connection when the mobile device is placed in proximity to the second computer.

The synchronization concept can work with mail applications, word processing applications, web browser-based applications, etc.

In another embodiment, there is provided a system for cross-platform synchronization including a first computer running a first operating system, a first application and a remote access component; and a second computer running a second operating system, a second application and an application delivery agent. The first operating system is different from the second operating system, and the first application is different from the second application. The mobile device runs a remote desktop displaying the first application. Upon the mobile device reaching proximity to the second computer, the mobile device connects to the second application delivery agent, and a state of the first application is transferred to the second application.

Optionally, the second application is a guest application executing in a Virtual Machine, and the second operating system is a guest operating system of the Virtual Machine. Optionally, the first operating system is MICROSOFT WINDOWS, and second operating system is MAC OS. Optionally, the first application is a mail application compatible with MICROSOFT WINDOWS. Optionally, second application is a mail application compatible with MAC OS. Optionally, the remote access component is a component of a remote access server that transmits the state of the first application to the remote desktop on the mobile device. Optionally, the remote access server is a PARALLELS PAX server or a PARALLELS RAS (Remote Access Server). Optionally, remote access server synchronizes data between the mobile device and the first and second computers and the remote access server provides a remote desktop with the first application. Optionally, data entered in the first application on the mobile device appears in the remote desktop via the remote access server. Optionally, data entered on the mobile device and the data entered in the first application appears in the second application via a wireless connection when the mobile device is in proximity to the second computer. Optionally, application delivery agent is a component of the remote access server that transmits the state of the first application to a remote desktop on the mobile device.

Optionally, the system also includes an authentication component that authenticates the first and second computers and the mobile device to each other. Optionally, the authentication component executes on a cloud and used to authenticate the mobile device and the second computer when the mobile device is located in a proximity to the second computer, and the authentication component authenticates the mobile device and the first or second computer when the mobile device is in a proximity to at least the second computer. Optionally, the system also converts the state of the first application to a format of the second application. Optionally, the system also includes a handoff module running on the mobile device and on the second computer and configured to detect if the mobile device and the first or the second computer are placed in proximity to each other. Optionally, the handoff module is an APPLE handoff module.

In another embodiment, a computer-implemented method for cross-platform synchronization includes connecting to a remote access server via a remote access client component on a mobile device; connecting the mobile device to a remote desktop of a first computer having a host application running on it; accessing the host application on the mobile device via the remote access server; acquiring user content into the host application on the mobile device; launching an application on a second computer; when the mobile device is in proximity to the second computer, sending the user content from the mobile device to the guest application over a wireless connection; and providing a user interface to a user for the host application on the first computer and for the guest application on the second computer with the synchronized data. The mobile device, the first computer and the second computer are working with the same user content.

Optionally, the method also includes launching the remote access client component on a mobile device. Optionally, the detecting utilizes an APPLE handoff module. Optionally, comprising passing handoff continuation streams between the devices. Optionally, the method also includes passing the handoff continuation streams between the devices for sending bulk data or email attachments using a WI-FI Direct protocol. Optionally, the method also includes entering user the content into the host application on the mobile device. Optionally, the application is a guest application on a Virtual Machine (VM) running on the second computer. Alternatively, the application is a native application running on the second computer. Optionally, the acquired user content is entered by the user into the host application using the mobile device. Optionally, the wireless connection uses Bluetooth LE.

In another embodiment, a system for cross-platform synchronization includes a remote access server in communication with a mobile device, a first computer and a second computer, and with a cloud-based authentication component configured to authenticate the mobile device and the second computer when the second computer is in proximity to the mobile device. The remote access server provides access to a host application via a remote access client component when the host application is running on the first computer. User content entered in the host application on the mobile device is synchronized with the host application via the remote access server. User content entered in an application on the second computer appears in the host application on the mobile device when the mobile device is in proximity to the second computer.

Optionally, a handoff module runs on the authentication component and is configured to detect if the mobile device and the first or second computer are placed in proximity to each other. Optionally, the host application is an email application. Optionally, the guest application is an email application. Optionally, both the host application and the guest application are the same type of email application from the same vendor. Optionally/alternatively, the host application is a word processing application, a browser or a blog. Optionally, the system also includes a cloud-based authentication component that is configured to authenticate the mobile device and the second computer when the first computer is located in proximity to the mobile device. Optionally, the application running on the second computer is a guest application running in a Virtual Machine. Optionally, the authentication component is also configured to authenticate the mobile device and the first computer.

The exemplary embodiments allow for building a seamless integration between remote applications accessed via mobile devices and local (desktop) applications, making it possible to transfer not only data between the local and the remote applications, but user activities and activity context as well. As a result, users get a continuous experience in a workspace consisting of local and remote applications running on mobile devices and remote computers.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
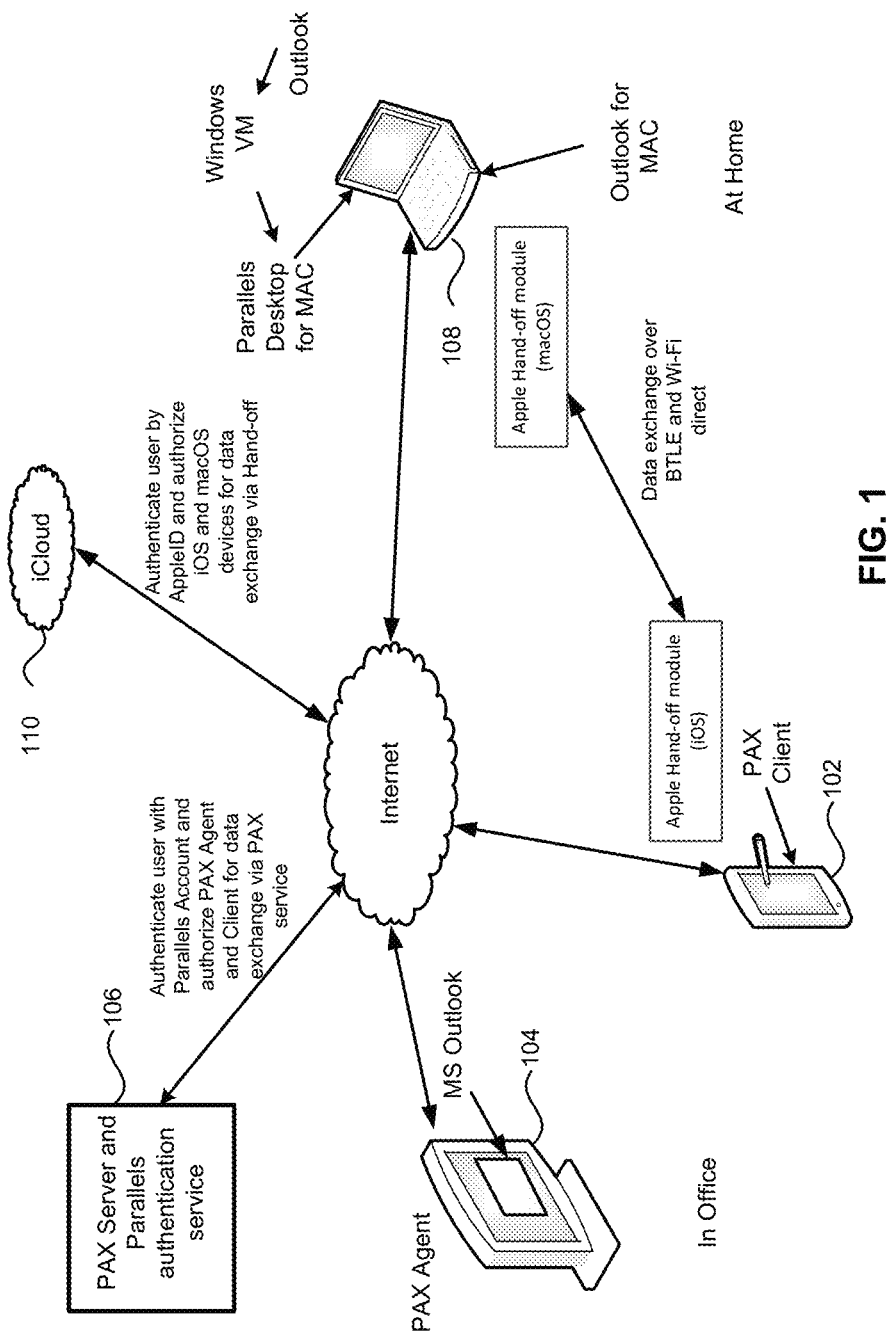
FIG. 1 illustrates a system architecture, in accordance with the exemplary embodiment.

Reference will now be made in detail to the preferred embodiments of the present invention, examples of which are illustrated in the accompanying drawings.

The term "remote access server" refers to any system that provides remote access to applications, desktops, devices, etc. It can be a physical or virtual server as well as a service or an application on a device.

An authentication component is any tool that can provide identification of the user or device.

An application delivery agent refers to any agent that opens, edits, creates, and/or manages applications or their windows.

According to the exemplary embodiment, a method, system and computer program product for seamless cross-platform application usage and data synchronization is provided. The present invention is related to cross-platform synchronization of user activities and related data. It allows for seamless transfer of user activity from an application running in a remote session (accessible via PAX/RAS clients) to a MAC computer, and vice versa (if a local application is a virtualized application running in a Virtual Machine under PARALLELS DESKTOP for MAC, although the invention is not limited to this specific example of virtualization or any particular implementation of Virtual Machines).

According to the exemplary embodiment, a user writes a message on his iPhone. The iPhone is connected to a remote access server (in one example, a PARALLELS Access (PAX) server from PARALLELS, although the inventive concept is not limited to the PAX example) over the Internet or other network. The PAX server provides an interface/remote access for management of remote desktop applications on mobile devices using a PAX client installed on the mobile device. The application (for example, MICROSOFT OUTLOOK, although the invention is not limited to this specific application, and is applicable to many other applications, such as word processors, mail applications, etc.) runs on the desktop. An agent component runs on the desktop, and connects to the PAX cloud infrastructure server.

The iPhone (or other mobile device, e.g., tablet, smartphone, ANDROID phone, etc.) is connected to the PAX server using its own PAX client component, and the user is able to use a remotely running MICROSOFT OUTLOOK as if it is running on his iPhone. A home computer (for example, a laptop or desktop) may also be connected to the PAX server over a home cloud. The laptop can be a MAC, with PARALLELS DESKTOP software and a Virtual Machine running MICROSOFT WINDOWS as the guest OS and a guest MICROSOFT OUTLOOK application, or it can have an OUTLOOK for MAC installed (i.e., as a native application).

The home laptop computer is also connected to the iCloud server (or another authentication component performing a similar function) in order to enable it to utilize the continuity feature and to authenticate the mobile device and the desktop/laptop computers. The user begins typing a message in MICROSOFT OUTLOOK while traveling from the office to his home. When the user physically approaches the laptop, the continuity feature recognizes the laptop and triggers an exchange event of the message data through the BTLE protocol or similar, to notify the laptop that data is available for exchange. The user can then sit down at his laptop at home and continue working seamlessly on the email.

For illustration purposes, this description refers to MICROSOFT OUTLOOK for WINDOWS (running in a remote session), and Mail for MAC OS (running on a MAC computer) or MICROSOFT OUTLOOK for WINDOWS (running in a PARALLELS DESKTOP for MAC Virtual Machine). However, the proposed method is applicable to a broad range of applications (text and spreadsheet processors, web browsers, calendars, planners, etc. —all the applications supporting querying and managing via Accessibility API (on MAC OS)/Automation API (on Windows).

This description also refers to PAX Client/Agent, but is also applicable to RAS Client/Agent. According to the exemplary embodiment, to implement the cross-platform user activity and data synchronization, the following components are employed:

1. PAX/RAS agent running on a remote computer and providing remote access to applications on the remote computer/session;
2. PAX/RAS Client for iOS, running on a mobile device;
3. Parallels Handoff Agent (PHA) (part of PAX agent or PARALLELS DESKTOP for MAC (PDfM)) running on a MAC OS computer;
4. MAC OS Accessibility Services; and
5. WINDOWS Automation Services;

A user runs an application in a remote session and works with it via PAX/RAS mobile client for iOS. When the user opens or activates a new email window in MICROSOFT OUTLOOK on his remote MICROSOFT WINDOWS computer, this action is intersepted by the PAX Agent and the information about it is transferred to the PAX Client. The PAX Agent uses the WINDOWS Automation API to query MICROSOFT OUTLOOK for current e-mail content and parameters (recipients list, attachments, etc). The data about this activity is then passed to the PAX Client.

When the PAX Client receives the information about current user activity (i.e., e-mail composing in MICROSOFT OUTLOOK), it creates an instance of an NSUserActivity class, initializes it with the received data, and sets it as a current user activity (i.e., calls NSUserActivitybecomeCurrent method). The NSUserActivity class, provided by the APPLE Foundation framework, represents a user activity in the given application and its context, which are necessary to "handoff" the activity from one device to another. By creating the NSUserActivity and setting it as "current," the PAX Client notifies the iOS that it has some activity available to "handoff" to another APPLE device.

If a user continues to compose email via the PAX Client, the PAX Agent sends data updates to the PAX Client periodically, so the PAX Client updates current NSUserActivity instance state accordingly. This data includes minimal information required to continue email composition on another device, such as a recipients' list, a subject, a current page and a scrolling position, etc.

When the user approaches his MAC computer, the APPLE handoff services check whether the mobile device and the MAC computer can pair up and can exchange activities. The exemplary prerequisites are:

the MAC computer should be running OS X 10.10 (or above), both mobile device and the MAC system should be signed to the same authentication server and a iCloud account (or an account on another authentication server that can authenticate the relevant devices, or, as an alternative, the authentication server can be a component or components or a service running on the mobile device and the computers in order the authenticate the devices to each other and to the remote access server);

both the mobile device and the MAC computer should support Bluetooth 4.0 LE or higher (it is used by the handoff module to advertise and exchange activities); and both applications should belong to the same developer (share the same developer Team ID or a vendor ID).

In the exemplary embodiment, both activity "sending" and "receiving" applications, the PAX Client on the iOS device and the PARALLELS handoff Agent on a MAC computer are associated with PARALLELS, so they are free to exchange user activities. Both iOS and MAC OS applications specify in their "Info.plist" files a set of string keys, representing activity types they could "handoff" to each other. As an example, "com.parallels.handoff.remoteapp" activity type can be used.

When an iOS device with a current NSUserActivity "com.parallels.handoff.remoteapp" being advertised appears in a vicinity of a MAC computer and gets paired up with it via a handoff service, the MAC OS performs necessary checks before starting the handoff process. If the MAC OS recognizes that it has an application from the same developer, which is capable to pick up the "com.parallels.handoff.remoteapp" activity, it displays a special icon in the Dock and Tasks Switcher. If the user clicks on this icon, the application (Parallels Handoff Agent (PHA)) is activated (or launched if it is not currently running) by the MAC OS and the information about the user activity is transferred to the application in a form of NSUserActivity object, which is handled in AppDelegate"application:continueUserActivity: restorationHandler:" method.

The PHA parses the information about the user activity, identifies which host application should be used to continue it, and launches the target application either directly or with help of AppleScript. In the exemplary case, a default application to compose an email is launched. Depending on MAC OS settings, a native MAC OS application (e.g., Mail), or a MICROSOFT WINDOWS application (e.g., MICROSOFT OUTLOOK for WINDOWS running inside PARALLELS DESKTOP for MAC VM) is launched.

According to the exemplary embodiment, if a native MAC OS application is launched, the PHA uses the MAC OS accessibility API to feed it with data necessary to continue e-mail composition. If an MICROSOFT WINDOWS application (e.g., MICROSOFT OUTLOOK for WINDOWS needs to be launched in a VM, the PHA interacts with PDfM/Parallels Shared Application stub to launch a correct application, and passes data from the NSUserActivity to a PARALLELS Tools service running inside a VM with MICROSOFT WINDOWS as the Guest OS. The PARALLELS Tools service, in turn, uses WINDOWS Automation API to feed MICROSOFT OUTLOOK with the data necessary to continue e-mail composition. At the end, an application on the MAC OS host (either native or running in a VM) opens a window for a new email composition, prefilled with recipients, subject, text, etc. The NSUserActivity is intended to pass a small amount of data only. If the original email contains attachments or an image, this data is passed by means of handoff continuation streams.

These streams (NSOutputStream and NSInputStream) are provided by APPLE Foundation framework to pass data between an originating device and the target MAC device. The APPLE uses WI-FI Direct to exchange large amounts of data quickly. The PAX Client requests the PAX Agent on the remote MAC host to send the data with attachments, images, etc., and passes the data via a continuation stream to the PHA, which, in turn, feeds this data to the email application (via an Accessibility API for a native MAC OS application, or via PARALLELS Tools service using WINDOWS Automation API for an application inside a VM).

To speed up the process, the PAX Client can ask the PAX Agent to start data synchronization in advance as soon as the PAX Agent detects that some bulk content (attachments, images, etc.) has been added to the email. This data is cached on a device, so when the handoff module asks the device to send the data via continuation streams, it can be sent immediately. When all the above operations are completed, the user gets a native or in-VM email application up and running with an active new email window with the same recipients list, subject, content, attachments, etc., as on his mobile device, and can continue composing the email locally. The process to handoff an e-mail composition from a MAC host application to a remote session is similar.

Since both the "sending" and "receiving" applications should belong to the same software vendor, the process cannot easily handoff user activity from a native APPLE Mail application to the PAX Client. However, it is possible to implement the handoff if, for example, one uses MICROSOFT OUTLOOK running in a VM with MICROSOFT WINDOWS as the Guest OS, under control of the PARALLELS Desktop (a VM supervisory component) for MAC. The PDfM creates a PARALLELS Shared Application Stub (PSAS) for each virtualized application. Since the PAX Client, the PHA and the PSAS belong to the same vendor, they can participate in handoff and exchange user activities. When a user starts or continues to compose an e-mail in a virtualized MICROSOFT OUTLOOK, the PSAS creates a NSUserActivity instance with "com.parallels.handoff.localapp" type, feeds it with an application context data and sets it current via the NSUserActivitybecomeCurrent method.

The PARALLELS Tools service which (is running inside the VM, and uses WINDOWS Automation API to query the running application for its context and data) sends this information to the PSAS via a PARALLELS protocol, and the PSAS uses this data to properly setup NSUserActivity. After this MAC OS handoff service starts to advertise this activity, and when an iOS device with the PAX Client is detected in a vicinity of the advertising MAC OS computer, the iOS notifies a user that the PAX Client can pick up an activity, by displaying a special icon on the home screen and in the running applications list.

If a user taps on the icon, the PAX Client is activated (or started) and the NSUserActivity object is passed to the PAX Client. The PAX Client parses the information provided in the NSUserActivity, connects to a remote MAC host and commands the PAX Agent on that MAC host to start an appropriate application (i.e., the MICROSOFT OUTLOOK in this example). After the application is started, the PAX Client sends the collected application context data to the PAX Agent, which, in turn, feeds the MICROSOFT OUTLOOK with it via the WINDOWS Automation API.

If the e-mail contains some bulk data, it is first sent by the PSAS to the PAX Client by means of the handoff continuation stream, then transferred from the PAX Client to the PAX Agent via a PARALLELS protocol, and then fed by the PAX Agent to the target application. When all the above operations are completed, the user gets a native email application up and running on a remote MAC host (or a mobile device), with an active new email window, with the same recipients list, subject, content, attachments, etc., as on his local computer, and can continue to compose the email on the remote computer on the go via the PARALLELS Access application from his iOS device.

FIG. 1 illustrates an architecture, in accordance with the exemplary embodiment. A user writes a message on his iPhone 102. The iPhone 102 has a PAX agent installed on it. The iPhone 102 is connected to a PAX server 106 over the Internet. The iPhone 102 is connected to a user office computer 104 connected to the PAX server 106. The PAX server 106 provides a remote access to the office computer 104 and can render the desktop applications (e.g., OUTLOOK) that are running on the office computer 104 on the mobile device 102.

A home laptop computer 108 is connected to a home cloud 110. The laptop 108 can have PARALLELS DESKTOP running MICROSOFT WINDOWS as the Guest OS in a VM and a guest OUTLOOK application, or it can have OUTLOOK for MAC installed. Once the iPhone 102 is brought into proximity to the laptop computer 108, the APPLE continuity feature is activated, and is used to transfer the data from the iPhone 102 to the laptop 108. Therefore, a message typed on the iPhone 102 appears in OUTLOOK on both computers 104 and 108, and the user can sit down at his laptop computer at home and seamlessly continue working on the email he was typing on his iPhone previously.

Figure 2:
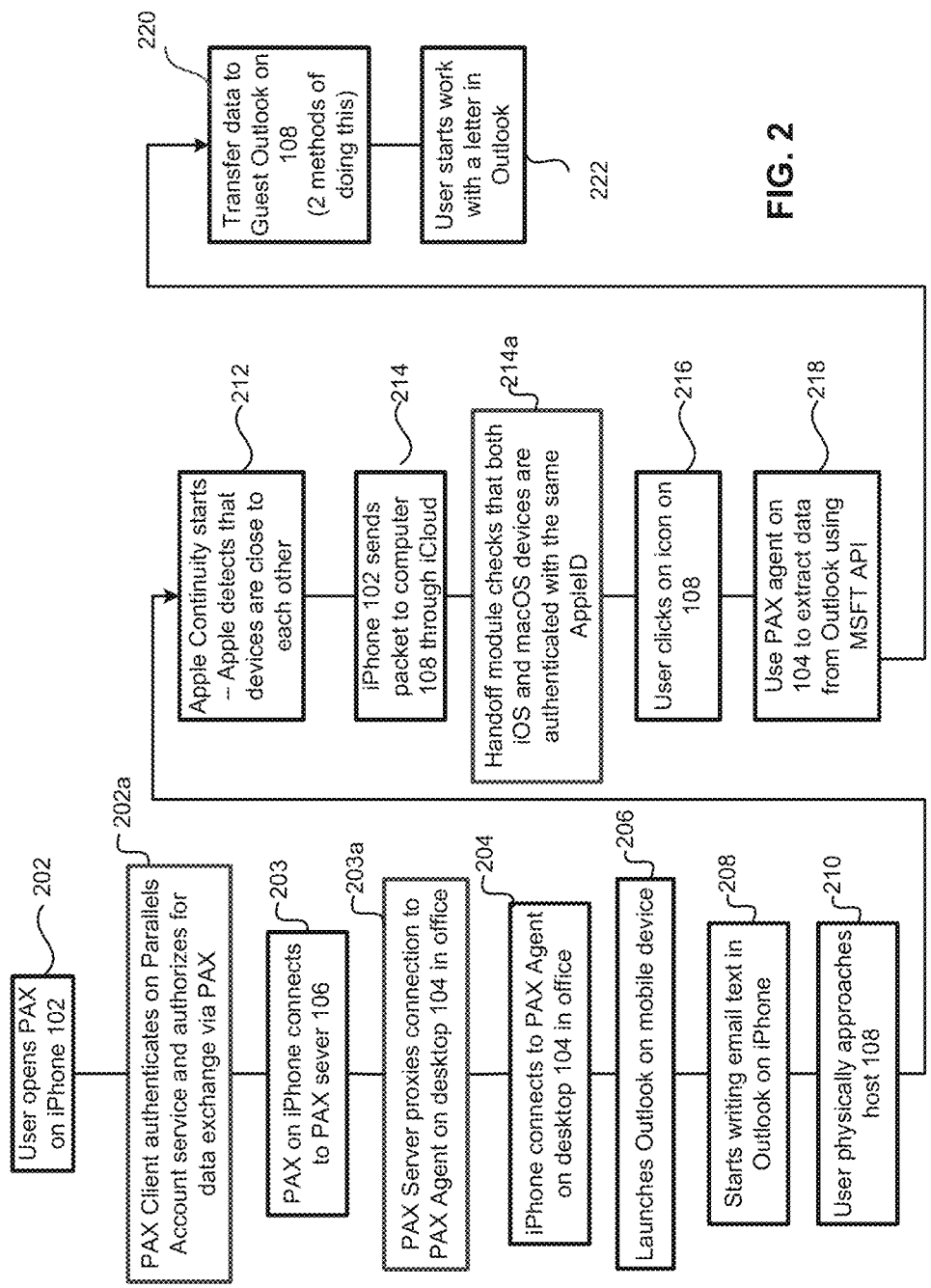
FIG. 2 illustrates a flowchart of a synchronization process, in accordance with the exemplary embodiment.

FIG. 2 illustrates a flowchart of a process, in accordance with the exemplary embodiment. In step 202, the user opens PAX remote access component on his iPhone 102 (see FIG. 1). In step 202a, PAX Client authenticates on Parallels Account service and authorizes for data exchange via PAX. In step 203, the PAX component on the iPhone 102 connects to the PAX server 106. In step 203a, the PAX Server proxies the connection to the PAX Agent on desktop 104 at the office. In step 204, the iPhone 102 connects to the office desktop 104. In step 206, OUTLOOK is launched on a mobile device (remotely from the PAX server using the PAX component running on the iPhone), and in step 208, the user writes an email text in the OUTLOOK on the iPhone 102. In step 210, the user gets into proximity of the laptop 108.

In step 212, an APPLE continuity component starts and detects that the iPhone 102 is close to the laptop 108. Then, in step 214, the iPhone 102 sends the packet to the laptop 108 via BTLE. In step 214a, Handoff module checks that both iOS and macOS devices are authenticated with the same AppleID. In step 216, the user clicks on the icon on the laptop 108. In step 218, user agent on the desktop 104 extracts data from MICROSOFT OUTLOOK using a MICROSOFT API. In step 220, the data is transferred to guest MICROSOFT OUTLOOK (or MICROSOFT OUTLOOK for MAC) on the laptop 108. In step 222, the user begins working with a letter in MICROSOFT OUTLOOK. Note that in the exemplary embodiment, any other application can be used instead of the MICROSOFT OUTLOOK. The system can also operate in a reverse direction. In other words, if a user writes something into the MICROSOFT OUTLOOK on the computer, he can see the text on his phone via the PAX agent.

Figure 3A:
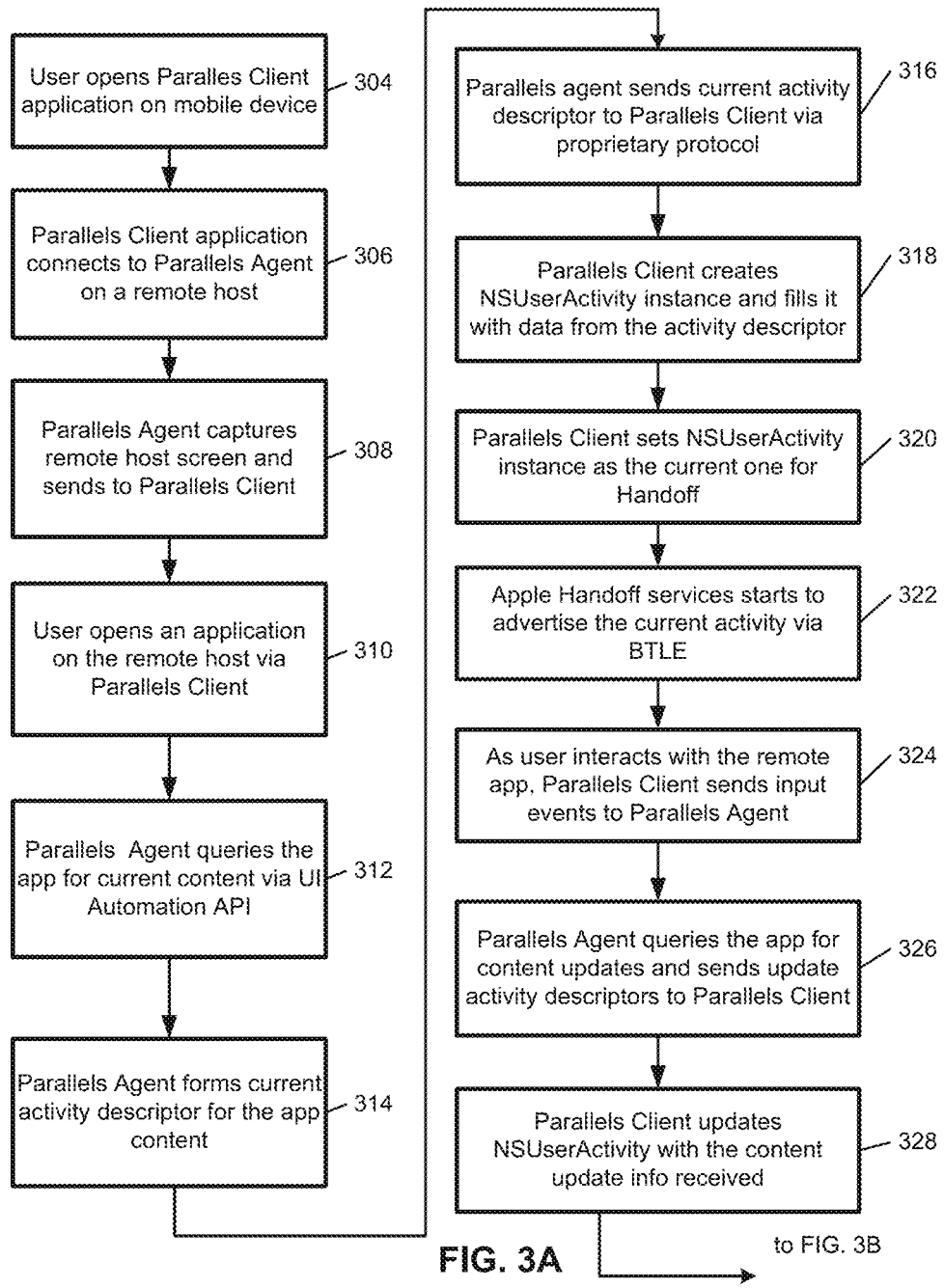
FIGS. 3A-3B illustrate a flowchart of a Handoff of a user activity from a remote application to a local MAC system, in accordance with the exemplary embodiment.
Figure 3B:
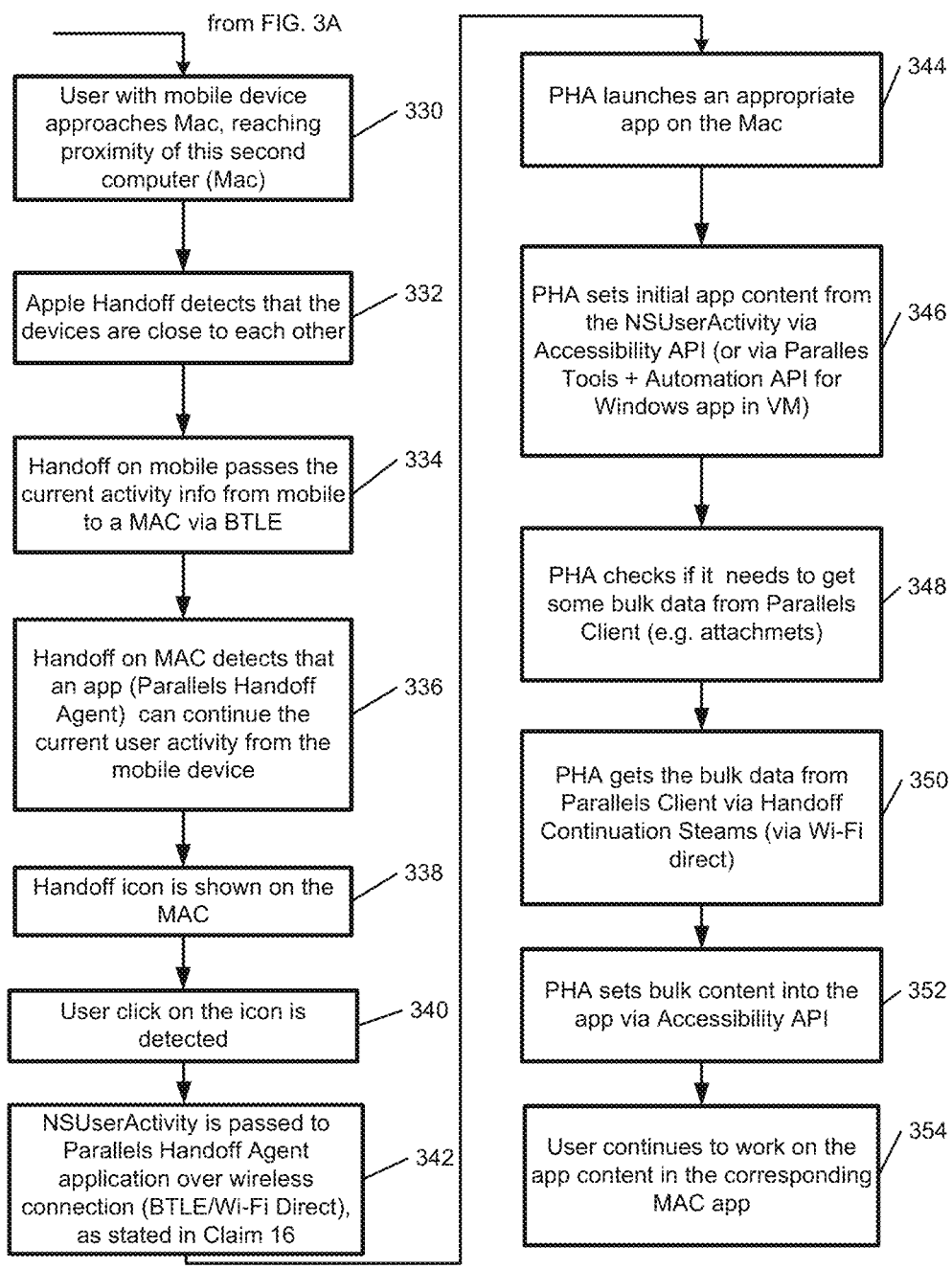

FIGS. 3A-3B illustrate a flowchart of a handoff of a user activity from a remote application to a local MAC system, in accordance with the exemplary embodiment. In FIG. 3A, in step 504, a user opens a PARALLELS Client application on his mobile device. In step 506, the PARALLELS Client application connects to a PARALLELS Agent on a remote MAC host (or a remote MICROSOFT WINDOWS host, for example). In step 508, the PARALLELS Agent captures a remote MAC (or MICROSOFT WINDOWS) host screen and sends it to the PARALLELS Client. In step 510, the user opens an application on the remote MAC host via the PARALLELS Client. In step 512, the PARALLELS Agent queries the application for the current content via user interface automation API. In step 514, the PARALLELS Agent for MICROSOFT sends a current activity descriptor for the application content.

In step 516, the PARALLELS Agent sends a current activity descriptor to the PARALLELS Client via a proprietary protocol. In step 518, the PARALLELS Client creates an NSUserActivity instance as the current one for the Handoff. In step 522 the Apple™ handoff service starts to advertise the current activity via a protocol such as, for example, Bluetooth 4 LE (BTLE). In step 524, as user interacts with the remote application, the PARALLELS Client sends the inputted events to the PARALLELS Agent. In step 526, the PARALLELS Agent queries the application for the content updates and sends the update activity descriptors to the PARALLELS Client. The PARALLELS Client updates NSUserActivity with the content update info received in step 528.

In FIG. 3B, in step 330, the user with mobile device approaches the MAC system. In step 332, the Apple™ handoff module detects that the devices are close to each other. The handoff on the mobile device passes the current activity info from the mobile device to the MAC host via the BTLE. In step 336, the handoff on the MAC host detects that an application (i.e., PARALLELS Handoff Agent) can continue the current user activity from the mobile device. In step 338, the handoff icon is shown on the MAC system. In step 340, a click on the icon is detected. In step 342, NSUserActivity is passed to the PARALLELS Handoff Agent application (e.g., over a wireless connection (BTLE/Wi-Fi Direct). In step 344, the PHA launches an application on the MAC system.

In step 346, the PHA sets the initial application content from the NSUserActivity via Accessibility API (or via PARALLELS Tools and automation API for WINDOWS application in the VM). The PHA checks if it needs to get some bulk data from PARALLELS Client (e.g., attachments) in step 348. In step 350, PHA gets the bulk data from PARALLELS Client via the Handoff Continuation Streams (via WI-FI direct, which enables devices to easily connect with each other without requiring a wireless access point. The WI-FI direct is usable for file transfer, and to communicate with more than one device simultaneously at typical WI-FI speeds) in step 350. The PHA sets bulk content into the application via Accessibility API in step 352. In step 354 the user continues to work on the application content in the corresponding MAC host application.

Figure 4A:
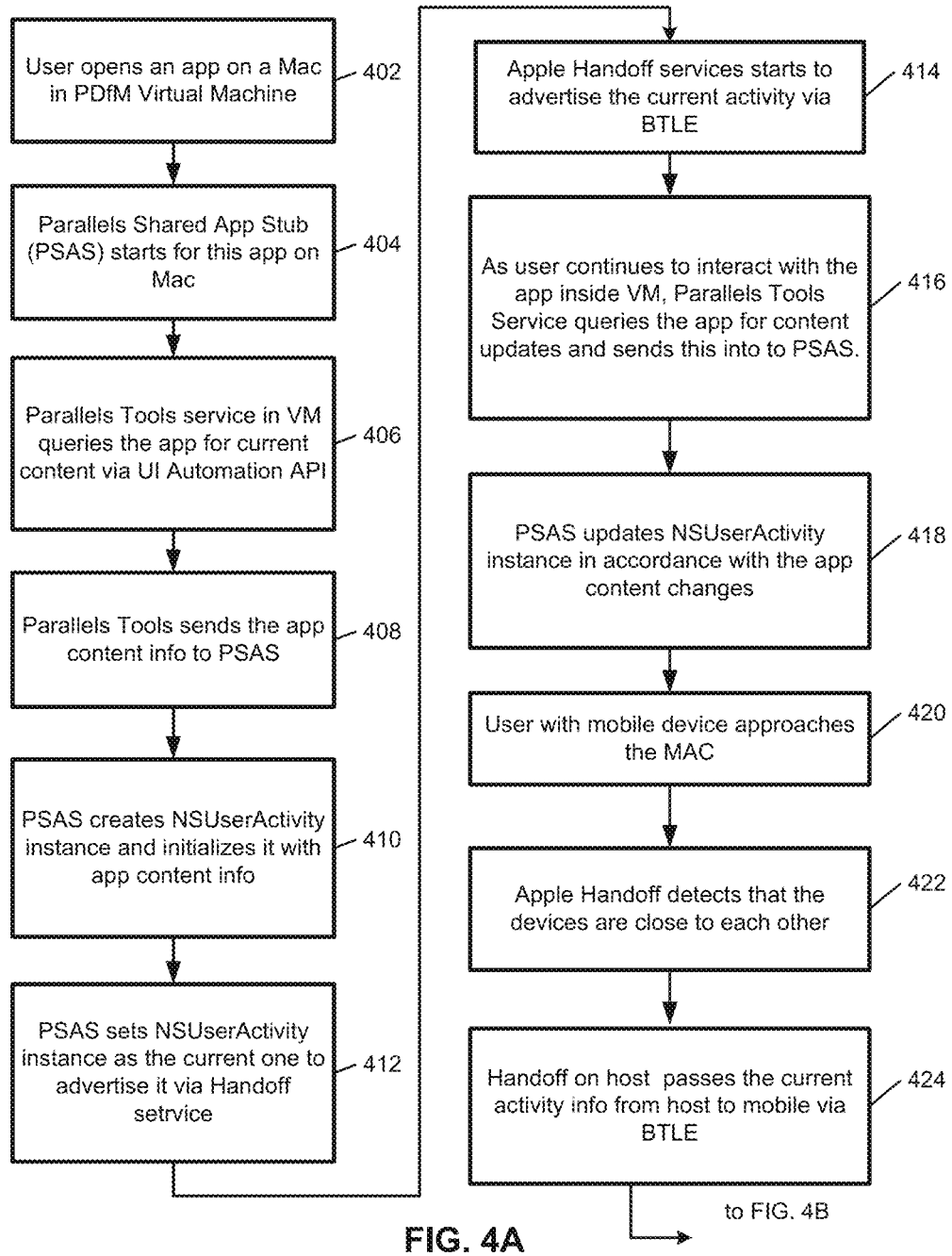
FIGS. 4A-4B illustrate a flowchart of a Handoff of a user activity from a local MAC system to a remote application, in accordance with the exemplary embodiment.
Figure 4B:
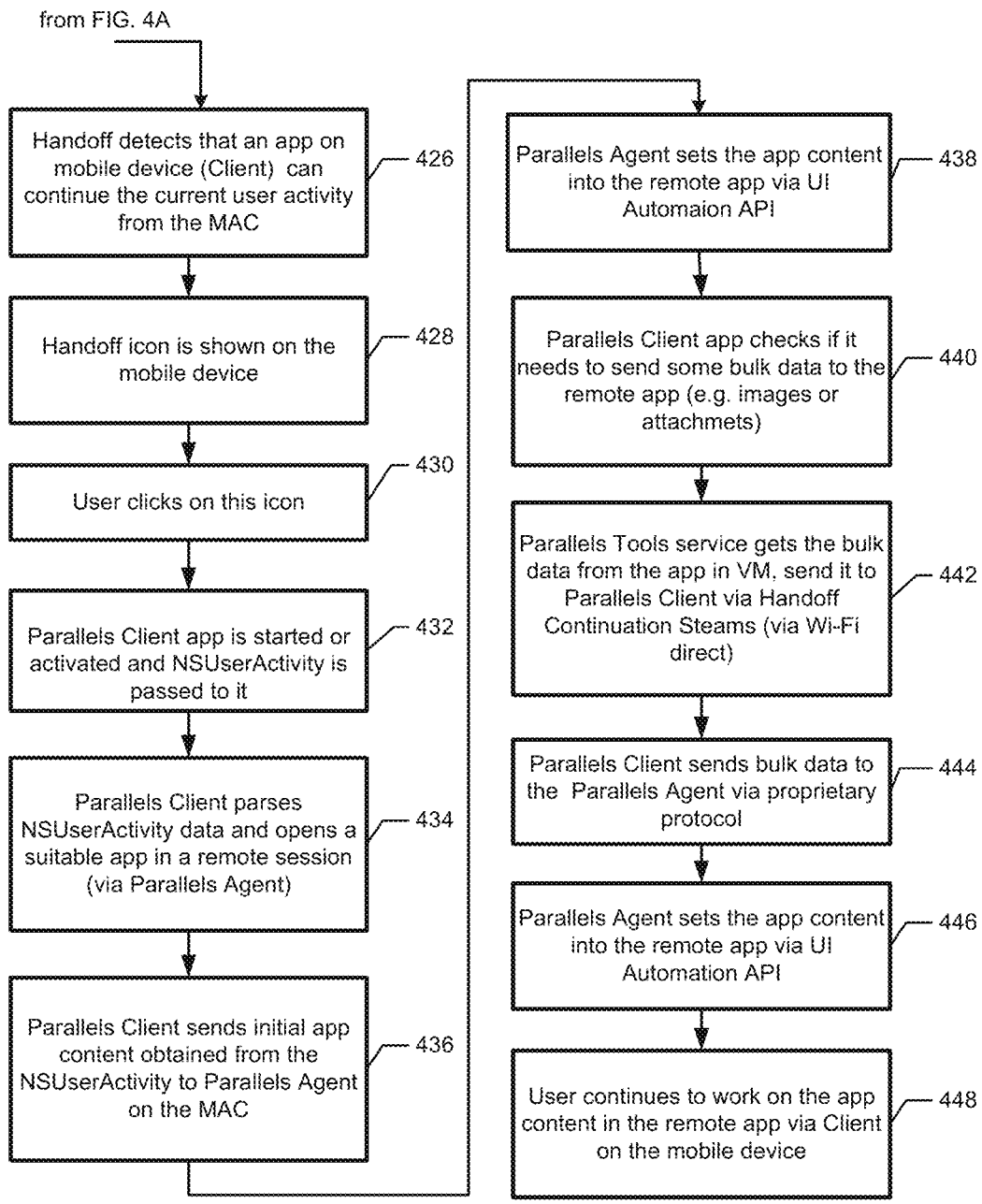

FIGS. 4A-4B illustrate a flowchart of a Handoff of a user activity from a local MAC system to a remote application running on a mobile device, in accordance with the exemplary embodiment. In FIG. 4A, in step 402, a user opens an application on a MAC system in PDfM virtual Machine (VM). The PARALLELS shared application stub (PSAS) starts for this application on MAC system in step 404. A VM PARALLELS Tools service in the VM queries the application for current content via a UI Automation API in step 406. The VM PARALLELS Tools service sends the application content data to PSAS in step 408. The PSAS creates an NSUserActivity instance and initializes it with the application content data in step 410. The PSAS sets NSUserActivity instance as the current one to advertise it via the APPLE Handoff service in step 412. The APPLE Handoff services starts to advertise the current activity via the BTLE in step 416. The PSAS updates the NSUserActivity instance in accordance with the applications content changes in step 418. In step 420, a user with mobile device approaches the MAC system and the APPLE Handoff service detects that the devices are close to each other in step 422. The Handoff on the MAC host passes the current activity data from the MAC host to the mobile device via the BTLE in step 424.

In FIG. 4B, the APPLE Handoff service detects that an application on the mobile device (i.e., Client) can continue the current user activity from the MAC system in step 426. A Handoff icon is displayed on the mobile device in step 428. After a user clicks on the Handoff icon in step 430, the PARALLELS Client application is started or activated and the NSUserActivity data is passed to the PARALLELS Client in step 432. The PARALLELS Client parses the NSUserActivity data and opens a suitable application in a remote session (via the PARALLELS Agent) in step 434. The PARALLELS Client sends the initial application content obtained from the NSUserActivity to the PARALLELS Agent on the remote MAC (or MICROSOFT WINDOWS) host in step 436.

In step 438, the PARALLELS Agent sets the application content into the remote application via UI Automation API. In step 440, the PARALLELS Client application checks if it needs to send some bulk data to the remote application (e.g., images or attachments). The PARALLELS Tools service gets the bulk data from the application in the VM and sends it to the PARALLELS Client via Handoff Continuation Streams (via WI-FI direct) in step 442. In step 444, the PARALLELS Client sends bulk data to the PARALLELS Agent. The PARALLELS Agent sets the application content into the remote application via the UI Automation API in step 446. Then, in step 448, the user continues to work on the application content in the remote application via the Client on the mobile device.

Figure 5:
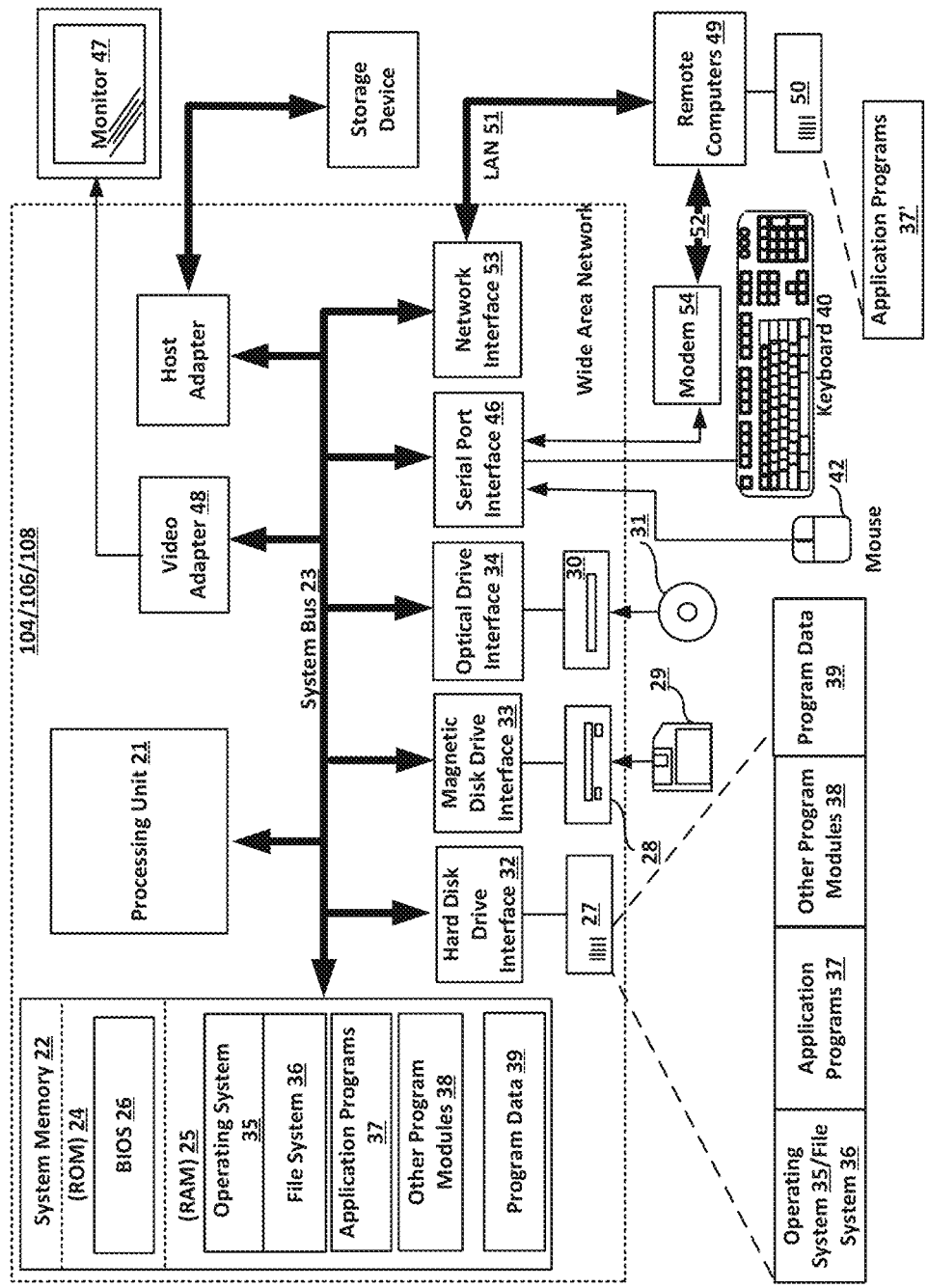
FIG. 5 illustrates a schematic of an exemplary computer system or a server that can be used for implementation of the invention.

With reference to FIG. 5, an exemplary system for implementing the invention includes a general purpose computing device in the form of a computer system/server 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104/106/108, such as during start-up, is stored in ROM 24.

The computer 104/106/108 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 104/106/108.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 104/106/108 includes a file system 36 associated with or included within the operating system 35, one or more application programs 37, other program modules 38 and program data 39. A user may enter commands and information into the computer 104/106/108 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 104/106/108 may operate in a networked environment using logical connections to one or more remote computers 49. The remote computer (or computers) 49 may be another computer, a server, a router, a network PC, a peer device or other common network node, and typically includes many or all of the elements described above relative to the computer 104/106/108, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 104/106/108 is connected to the local network 51 through a network interface or adapter 53. When used in a WAN networking environment, the computer 104/106/108 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 104/106/108, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A method comprising:

accessing, from a client device, a first application instantiated on a first computing device, the first computing device having a first operating system and being remote to the client device;

displaying, to a user of the client device, a user interface of the first application;

receiving, from the first computing device, a user activity descriptor, wherein the user activity descriptor is indicative of an ongoing user activity in connection with the first application;

responsive to the client device reaching proximity to a second computing device, providing the user activity descriptor to the second computing device, the second computing device having a second operating system, wherein the second operating system is of a different type than the first operating system;

receiving, by the client device from the first computing device, a data associated with the first application; and responsive to a second application being instantiated on the second computing device, providing, from the client device to the second computing device, the data associated with the first application, wherein the data associated with the first application is to allow the user to continue the ongoing user activity on the second application;

wherein providing the user activity descriptor to the second computing device is via a first communication channel between the client device and the second computing device, and wherein providing the data associated with the first application to the second computing device is via a second communication channel between the client device and the second computing device, the second communication channel being different from the first communication channel.

2. The method of claim 1, wherein the client device and the second computing device are signed to a same authentication service before the user activity descriptor is provided to the second computing device.

3. The method of claim 1, wherein the second application is of a same type as the first application.

4. The method of claim 1, wherein the first application is at least one of a mail application, a document-processing application, a web browser, or an activity-scheduling application.

5. The method of claim 1, wherein the ongoing user activity comprises composing one or more email messages and wherein the user activity descriptor comprises at least some of a list of recipients, a subject, a current page, or a scrolling position for at least some of the one or more email messages.

6. The method of claim 1, wherein the ongoing user activity comprises composing one or more email messages and wherein the data associated with the first application comprises at least some of an attachment or an image associated with at least some of the one or more email messages.

7. The method of claim 1, wherein the client device reaching proximity to the second computing device is detected by a handoff service associated with the second operating system, and wherein the user activity descriptor is provided to a third party handoff agent.

8. A method to transfer a user activity to a first computing device rom a second computing device, the method comprising:

responsive to a client device reaching proximity to the second computing device, receiving, by the client device, a user activity descriptor from the second computing device, the second computing device having a second operating system, wherein the user activity descriptor is indicative of an ongoing user activity in connection with a second application running on the second computing device;

sending, from the client device, a request to instantiate a first application on a first computing device, the first computing device having a first operating system and being remote to the client device, wherein the first operating system is of a different type than the second operating system, and wherein the request to instantiate the first application comprises the received user activity descriptor;

receiving, from the first computing device, a user interface for the first application;

displaying, to the user of the client device, the received user interface for the first application;

receiving, by the client device from the second computing device, data associated with the second application; and responsive to instantiating the first application on the first computing device, providing, from the client device to the first computing device, the received data associated with the second application, wherein the data associated with the second application is to allow the user to continue the ongoing user activity on the first application;

wherein providing the user activity descriptor to the first computing device is via a first communication channel between the client device and the first computing device, and wherein providing the data associated with the first application to the first computing device is via a second communication channel between the client device and the first computing device, the second communication channel being different from the first communication channel.

9. The method of claim 8, wherein the client device and the second computing device are signed to a same authentication service before the user activity descriptor is received from the second computing device.

10. The method of claim 8, wherein the first application is at least one of a mail application, a document-processing application, a web browser, or an activity-scheduling application.

11. The method of claim 8, wherein the ongoing user activity comprises composing one or more email messages and wherein the user activity descriptor comprises at least some of a list of recipients, a subject, a current page, or a scrolling position for at least some of the one or more email messages.

12. The method of claim 8, wherein the ongoing user activity comprises composing one or more email messages and wherein the data associated with the first application comprises at least some of an attachment or an image associated with at least some of the one or more email messages.

13. The method of claim 8, wherein the client device reaching proximity to the second computing device is detected by a handoff service associated with the second operating system, and wherein the user activity descriptor is provided by a third party handoff agent.

14. A system comprising:

a memory that stores instructions; and a processing device to execute the instructions stored in the memory to:

access, from a client device, a first application instantiated on a first computing device, the first computing device having a first operating system and being remote to the client device the first computing device having a first operating system and being remote to the client device;

display, to a user of the client device, a user interface of the first application;

receive, from the first computing device, a user activity descriptor, wherein the user activity descriptor is indicative of an ongoing user activity in connection with the first application;

responsive to the client device reaching proximity to a second computing device, provide the user activity descriptor to the second computing device having a second operating system, wherein the second operating system is of a different type than the first operating system;

receive, by the client device from the first computing device, a data associated with the first application;

responsive to a second application being instantiated on the second computing device, provide, from the client device to the second computing device, the data associated with the first application, wherein the data associated with the first application is to allow the user to continue the ongoing user activity on the second application;

wherein providing the user activity descriptor to the second computing device is via a first communication channel between the client device and the second computing device, and wherein providing the data associated with the first application to the second computing device is via a second communication channel between the client device and the second computing device, the second communication channel being different from the first communication channel.

15. The system of claim 14, wherein the client device and the second computing device are signed to a same authentication service before the user activity descriptor is provided to the second computing device.

16. The system of claim 14, wherein the first application is at least one of a mail application, a document-processing application, a web browser, or an activity-scheduling application.

17. The system of claim 14, wherein the ongoing user activity comprises composing one or more email messages and wherein the user activity descriptor comprises at least some of a list of recipients, a subject, a current page, or a scrolling position for at least some of the one or more email messages.

18. The system of claim 14, wherein the ongoing user activity comprises composing one or more email messages and wherein the data associated with the first application comprises at least some of an attachment or an image associated with at least some of the one or more email messages.

19. The method of claim 1, wherein receiving the user activity descriptor from the second computing device is via a first communication channel between the client device and the second computing device, and wherein receiving the data associated with the first application from the second computing device is via a second communication channel between the client device and the second computing device, the second communication channel being different from the first communication channel.

* * * * *